United States Patent [19]

Johnson

[11] Patent Number: 4,476,693
[45] Date of Patent: Oct. 16, 1984

[54] THERMAL ENERGY ACCUMULATION

[76] Inventor: Lonnie G. Johnson, 2923 N. Casitas Ave., Altadena, Calif. 91001

[21] Appl. No.: 130,417

[22] Filed: Mar. 14, 1980

[51] Int. Cl.$^3$ .............................................. F25D 9/00
[52] U.S. Cl. .......................................... 62/402; 62/86
[58] Field of Search ............................ 62/86, 401, 402

[56]  References Cited
U.S. PATENT DOCUMENTS 2,772,621  12/1956  Arnoldi .................................. 62/402
2,963,878  12/1960  Beggs et al. .......................... 62/402
3,083,546   4/1963  Turek ..................................... 62/402

Primary Examiner—Ronald C. Capossela

[57] ABSTRACT

A fluid flowing under pressure from a source powers a thermal energy accumulation means which accumulates thermal energy in a controlled volume through which the fluid flows. The device comprises a heat engine and heat exchanger working in combination to extract thermal energy from fluid leaving the controlled volume and supply it to that flowing to the controlled volume in a manner such that the fluid leaves with less thermal energy than when initially supplied from its source.

6 Claims, 3 Drawing Figures

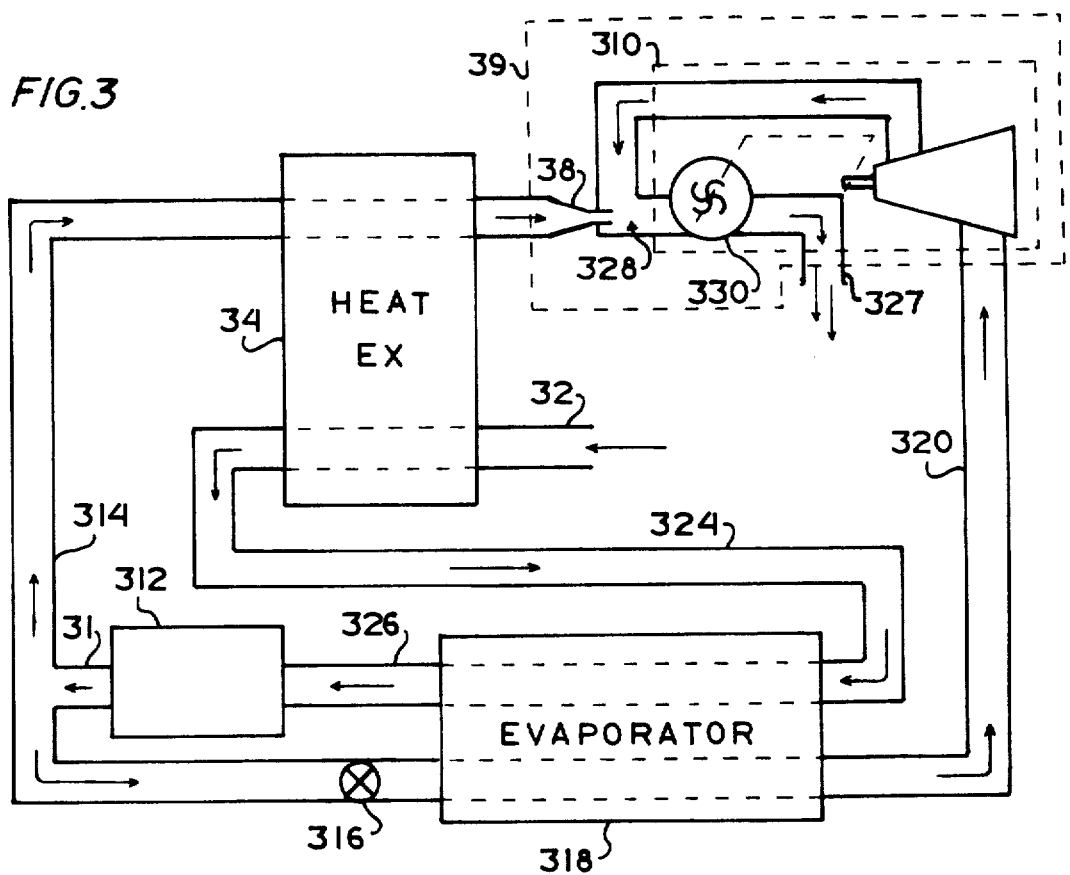

THERMAL ENERGY ACCUMULATION

BACKGROUND AND SUMMARY OF THE INVENTION

The invention is an energy conservation device intended for use in providing flowing fluid through a controlled volume at an elevated temperature under conditions where conventional heating techniques are impractical or undesired and where the fluid is supplied under pressure from its source. The invention derives operating power from the mechanical energy of the pressurized fluid flow and utilizes the fluid as a working fluid in a heat engine. It operates in an open thermodynamic loop and utilizes a nozzle means for supplying high velocity flow to compress and near adiabatically condense fluids having large saturated vapor to liquid volume ratios. The device operates to accumulate thermal energy inside the controlled volume by extracting an amount of heat from fluid flowing from the controlled volume and supplying it to fluid flowing to the controlled volume sufficient to cause the fluid flowing from the controlled volume to exit at a lower temperature than that at which the fluid is supplied from its source.

An application and supporting approximations for utilizing the invention to supply heated running water in a bathroom sink are included herein but are not intended to limit the coverage of this patent. A modified version of the invention is included which shows its use to cool or deplete thermal energy from a controlled volume.

BRIEF DESCRIPTION OF THE DRAWINGS

FIG. 3 is a device representative of the present invention used for depleting thermal energy from a controlled volume.

DETAILED DESCRIPTION AND PREFERRED EMBODIMENT OF THE INVENTION

Figure 1:
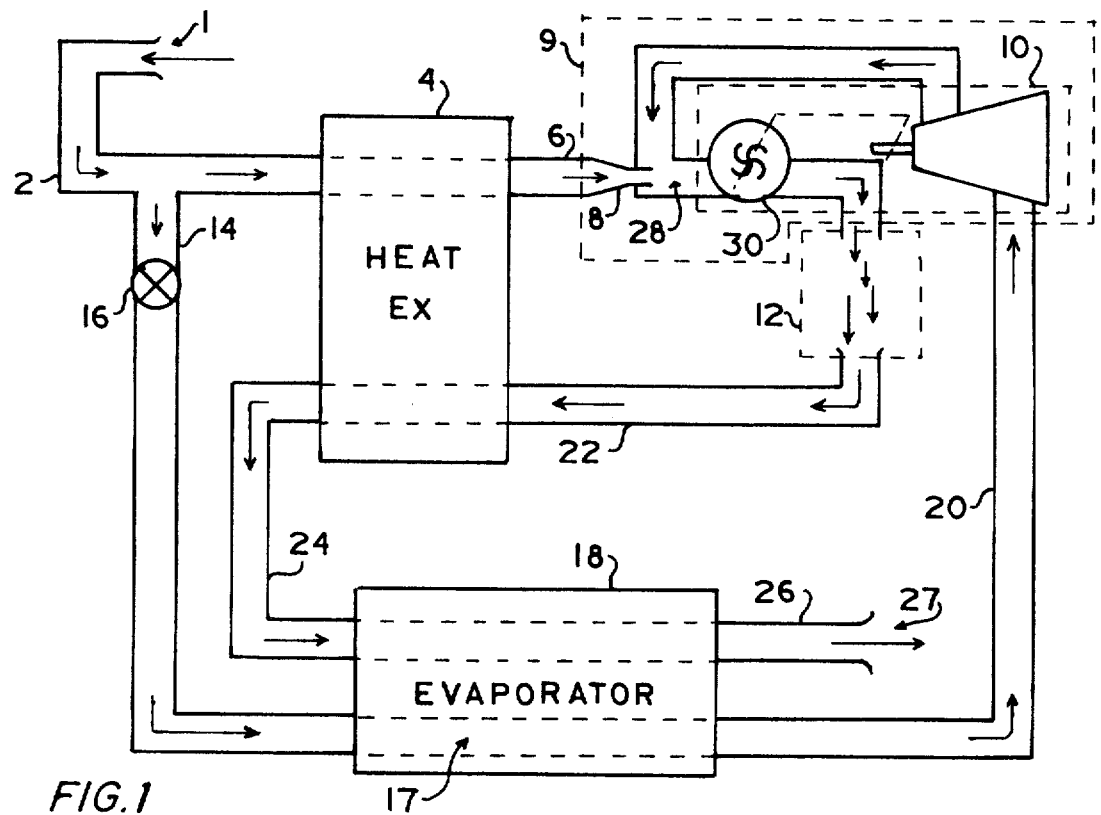
FIG. 1 is a flow diagram showing a device representative of the present invention for accumulating thermal energy in a controlled volume. Shown are a heat exchanger, an evaporator, an expansion valve, a controlled volume and a compression-condensation means comprising a nozzle means and a pump means.

Definition of terms:
Q-heat
$\dot{Q}$-rate of heat transfer
V-volume
v-specific volume
$\bar{V}$-Velocity
P-pressure
m-mass
$\dot{m}$-mass flow rate
$g_c$-gravitational constant
W-work
$\dot{W}$-rate at which work is performed
Z-height
U-internal energy
E-energy
$c_v$-specific heat at constant volume
lbm-pound mass
BTU-British thermal units
Subscripts:
p-pump
i-initial state or input to the fluid
e-final state or removed from the fluid
ev-evaporator
c-compressor An understanding of the construction and operation of the present invention can be derived from the following description with reference to the drawings. Referring to FIG. 1, pressurized fluid enters the device at port 1 into duct 2. Duct 2 conducts the fluid to heat exchanger 4 through which it flows to duct 6 through to compression-condensation means 9 comprised of nozzle 8 and pump 10. The fluid flows through nozzle 8 to pump 10 where it actuates impeller 30 and exits into controlled volume 12. Duct 14 couples a portion of the flow from duct 2 to expansion valve 16 which supplies it to evaporator 18. Exiting evaporator 18 as a vapor, the fluid flows through duct 20 to pump 10 which supplies it to nozzle 8. Fluid flowing through controlled volume 12, exits through duct 22 flowing into heat exchanger 4 through to duct 24. Duct 24 couples the flow to evaporator 18 through which it flows to duct 26. The fluid exits the device from duct 26 through port 27.

Operation of the device is such that fluid flowing under pressure to nozzle 8 through duct 2, heat exchanger 4 and duct 6 supplies operating power to pump 10 by actuating impeller 30 as it exits nozzle 8. Heat is transferred to the fluid elevating its temperature as it flows through heat exchanger 4. Operation of pump 10 creates first low pressure region 17 to facilitate fluid vaporization in evaporator 18. High velocity fluid flow from nozzle 8 creates second low pressure region 28. Pump 10 pumps vaporized fluid through duct 20 from evaporator 18 and supplies it at an increased pressure to low pressure region 28.

To create low pressure region 28, pressurized fluid entering nozzle 8 increases in velocity as its flow cross sectional area is decreased. As a result, the fluid's pressure decreases in accordance with the conservation of energy equation:

$$Q_i + W_i + U_i + P_iV_i + m\bar{V}_i^2/2g_c + Z_i = Q_e + W_e + U_e + P_eV_e + m\bar{V}_e^2/2g_c + Z_e$$

For conditions of no work, no heat transfer, and no change in elevation, the equation simplifies to:

$$U_i + P_iV_i + m\bar{V}_i^2/2g_c = U_e + P_eV_e + m\bar{V}_e^2/2g_c$$

Assuming ideal flow, the equation further simplifies to:

$$P_iV_i + m\bar{V}_i^2/2g_c = P_eV_e + m\bar{V}_e^2/2g_c$$

Where the i subscript denotes the initial condition of the fluid prior to entering the nozzle and e denotes its exit condition.

The velocity increases resulting from flow through the nozzle is sufficient to effect a reduction in the fluid's pressure below that of vaporization. Vapor supplied by pump 10 to low pressure region 28 mixes in turbulent flow with fluid exiting nozzle 8. A final stage of compression occurs as the fluid's velocity decreases down stream and its pressure increases causing the vaporized portion to adiabatically condense and further elevate the fluid's temperature. Mechanical energy is lost by the fluid as as it performs work in compressing the vaporized portion and in actuating pump 10.

The fluid flows through controlled volume 12 and exits through duct 22 into heat exchanger 4 where heat is transferred from it to fluid entering through duct 2. The exiting fluid then flows from heat exchanger 4 into duct 24 at a temperature reduced to near that of fluid entering from the source. As the exiting fluid flows from duct 24 through evaporator 18, additional heat is removed as it supplies heat of vaporization to fluid entering from expansion valve 16. The fluid exits the device through duct 26 near the temperature at which the entering fluid is vaporized which is below that at which it enters from the source. The difference in thermal energy is accumulated in controlled volume 12.

Figure 2:
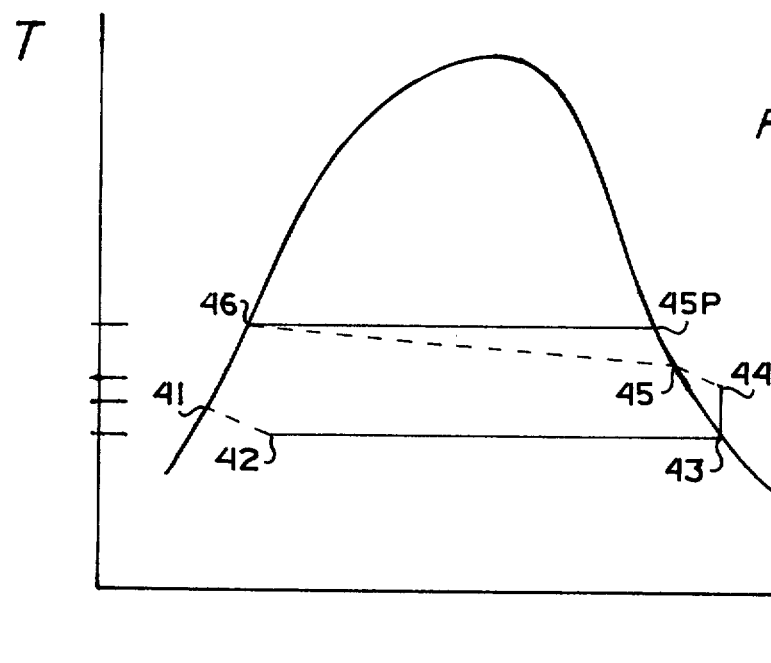
FIG. 2 is a temperature entropy diagram showing the state changes of the portion of the entering fluid which is vaporized and recondensed in flowing to the controlled volume.

The temperature entropy (T-S) diagram shown in FIG. 2 depicts the state changes experienced by fluid vaporized in evaporator 18 and condensed flowing to controlled volume 12. Assuming the fluid is incompressible in its initial liquid state, it is adiabatically throttled from state 41 to state 42 in passing through expansion valve 16 into evaporator 18. The fluid continues to vaporize passing from state 42 to state 43 in evaporator 18 due to heat transfer from fluid leaving controlled volume 12. Fluid flowing from duct 2 through heat exchange 4 exits at an elevated temperature, and thus with a higher vaporization pressure that fluid vaporized in the evaporator. Pump 10 supplies vaporized fluid to second low pressure region 28 at this higher pressure going from saturated vapor state 43 to compressed gas state 44. At state 44 the vaporized fluid mixes in tubulent flow with the high velocity fluid leaving nozzle 8. Heat is transferred across the phase boundaries as the two phase flow experiences a velocity decrease and therefore a pressure increase going from state 44 to saturated vapor state 45. Impeller 30 is actuated in the process supplying operating power to pump 10. As the pressure continues to increase with decreasing velocity, the vapor is condensed and the fluid's temperature is further elevated going from state 45 to saturated liquid state 46. The fluid's velocity continues to decrease as it enters controlled volume 12 and flows through at an elevated temperature as a compressed liquid at ambient pressure.

The conservation of energy equation can be applied to the fluid going from duct 2 through heat exchanger 4 and evaporator 18 to controlled volume 12 as follows:

$$Q_i + U_i + P_i V_i + m\overline{V}_{HD}{}^2/2g_c = U_e P_e V_e + m\overline{V}_e{}^2/2g_c$$

assuming no change in elevation. The i and e subscripts on the perameters U, P, V and $\overline{V}$ denote the fluid's initial state entering duct 2 and its end state flowing into controlled volume 12 respectively. $Q_i$ is the heat input from fluid exiting the device through the heat exchanger and evaporator and can be represented as two parts, $Q_{ev}$, heat input in the evaporator and $Q_{ih}$, heat input in the heat exchanger. So that $$Q_i = Q_{ih} + Q_{ev}$$

The fluid performs mechanical work in compressing the vaporized portion from state 43 through to state 46. Some of the energy available for this work is lost with that portion of the fluid which flows through the expansion valve for vaporization. The compressive work can be expressed as $$W_c = (PV + m\overline{V}^2/2g_c)_c$$

and the energy lost as:

$$W_L = (PV + m\overline{V}^2/2g_c)_L$$

so the total pump energy consumption includes $W_c$ and $W_L$.

$$E_p = W_c + W_L = (PV + m\overline{V}^2/2g_c)_p$$

$$E_p = (PV + m\overline{V}^2/2g_c)_p$$

The pump energy expended on the fluid and the heat transferred to it combine to increase the fluid's temperature. In terms of energy balance, the representative equation is:

$$E_p + Q_1 = mc_c(T_e - T_i) = \Delta U$$

and $$U_e = U_i + \Delta U$$

The total energy balance becomes:

$$U_i + P_i V_i + m\overline{V}_i{}^2/2g_c - (PV + m\overline{V}^2/2g_c)_p + W_c + W_L + Q_{ev} + Q_{ih} = U_e + P_e V_e + m\overline{V}_e{}^2/2g_c$$

A straightforward application of the present invention would be its use to supply heated water flow through a bathroom sink used for washing hands. In this case the faucet and drain of the sink comprise the entrance and exit respectively of the controlled volume. The system would be constructed to supply heated water flow from the faucet into the sink. Heat would be removed from water flowing from the sink through the drain and supplied to fresh water entering the system from the source. As an example, assume the water enters from a water main at a temperature of 50° F. and a pressure of 40 psig (above ambient), and that at some point during the energy accumulation process, water is entering the controlled volume at 110° F. To make a simplified approximation of $\dot{W}_c$ and $\dot{Q}_{ev}$, the rate of compressive work and the rate of heat transfer in the evaporator respectively, assume that the path taken in going from state 43 to state 46 is 43-45p-46 and that the enthalpy increase going from state 43 to 45p equals $W_c$. If the fluid leaving the expansion valve is evaporated at 40° F., then the heat of vaporization, $Q_{ev}$, extracted from fluid flowing through the evaporator from the controlled volume is 1071.3 BTU/lbm. At state 43, 40° F. the enthalpy, $h_{ev}$, is 1079.3 BTU/lbm and at state 45p, 110° F., the enthalpy, $h_c$, is 1109.5 BTU/lbm and $$W_c = m(h_c - h_{ev}).$$

The ratio, $\beta$, of heat removed from the exiting fluid for supply to the controlled volume to the required compressor energy is $$\beta = Q_{ev}/(h_c - h_{ev}) = 35.5$$

The pump energy available from the source water at 40 psig can be approximated at zero velocity as:

$$E_p = m \int v dP$$

and $$vdP = v(P_i - P_e)$$
$$= 0.01608 \text{ ft}^3/\text{lbm} \times (40.0 - 0.0)\text{lbf/in}^2$$
$$= \frac{144 \text{ in}^2/\text{ft}^2}{778 \text{ ft-lbf/Btu}}$$
$$= 0.119 \text{ BTU/lbm}$$

If water is leaving the source at a rate of 4 gallons per minute, the mass flow rate into the device, $\dot{m}_t$, is 0.56 lbm/sec. $\dot{Q}_{ev}$ and $\dot{W}_c$ are determined using the system of equations:

$$\dot{W}_c = \dot{m}_{ev}(h_c - h_{ev})$$
$$\dot{W}_c = \dot{m}_c \int vdP$$
$$\dot{m}_t = \dot{m}_c + \dot{m}_{ev}$$

Where $\dot{m}_{ev}$ is the mass flow rate through the expansion valve and $\dot{m}_c$ is the mass flow rate through the heat exchanger to nozzle 8.

The equations yield:

$$\dot{m}_{ev} = \dot{m}_t \int vdP / (h_c - h_{ev} + \int vdP)$$
$$= \frac{0.56 \text{ lbm/sec} \times 0.119 \text{ BTU/lbm}}{30.2 \text{ BTU/lbm} + 0.119 \text{ BTU/lbm}}$$
$$= 2.2 \times 10^{-3} \text{ lbm/sec}$$

and the rate of energy extraction from fluid leaving through the evaporator is $$\dot{Q}_{ev} = Q_{ev} \times \dot{m}_{ev}$$
$$= 2.36 \text{ BTU/sec}$$
$$= 2.48 \text{ kilowatts}$$

and $$\dot{W}_c = \dot{m}_c \int vdP$$
$$= (\dot{m}_t - \dot{m}_{ev}) \int vdP$$
$$= 0.0664 \text{ BTU/sec}$$
$$= 0.0699 \text{ kilowatts}$$

There are many other applications of the invention. FIG. 3 shows a modified version for depleting thermal energy from a controlled volume. Fluid enters the device through duct 32 from a pressurized source and flows through heat exchanger 34. The fluid is cooled in the heat exchanger and exits through duct 324 into evaporator 318 where it supplies vaporization heat to fluid entering from expansion valve 316 and exiting as a vapor into duct 320. The chilled fluid then flows through controlled volume 312. It exits the controlled volume flowing into duct 314 which supplies it to expansion valve 316 and heat exchanger 34. Flowing through heat exchanger 34, the fluid extracts heat from fluid entering the heat exchanger through duct 32. The fluid then flows through nozzle 38 creating low pressure region 328. As the flow continues, it supplies operating power to pump 310 which pumps vaporized fluid from evaporator 318 through duct 320 and supplies it to low pressure region 328. The vaporized fluid is adiabatically condensed as previously described and exits the device through port 327.

The invention is a heat engine and heat-exchanger in combination which derives operating power from the mechanical energy of a fluid to or from which it transfers heat by utilizing the fluid as a working fluid in the heat engine as the fluid flows therethrough. The fluid is supplied from a source and exits into a drain. The use of a fluid flowing from a source to power a heat engine in which the fluid is utilized as a working fluid and undergoes thermodynamic phase changes to effect heat transfer to or from itself as it flows through is believed to be novel and is encompassed in the coverage of this patent.

What is claimed is:

1. In combination with a pressurized fluid source supplying fluid flow to a controlled volume for flow therethrough, thermal energy accumulation means wherein a heat exchanger means and a heat engine means operate in combination to transfer an amount of thermal energy from fluid flowing from said controlled volume to fluid flowing to said controlled volume sufficient to effect the accumulation of thermal energy inside said controlled volume and thereby cause said fluid to flow therethrough at an elevated temperature, said heat engine means deriving operating power from said pressurized fluid flow and utilizing said fluid as a working fluid in said heat engine means and causing said fluid to undergo thermodynamic phase changes to effect heat transfer, said heat exchanger means being coupled to said pressurized fluid source and to said controlled volume and effecting an initial transfer of heat from fluid flowing from said controlled volume to fluid being supplied to said controlled volume, said heat engine means being coupled to said heat exchanger means and to said controlled volume to effect a final transfer of heat from fluid flowing from said controlled volume to fluid being supplied to said controlled volume by transferring heat to fluid heated in said heat exchanger means and flowing therefrom from fluid cooled in said heat exchanger means and flowing therefrom, said controlled volume receiving heated fluid from said heat engine means, said pressurized fluid from said source flowing through said heat exchanger means in a pressurized state to said heat engine means, said pressurized fluid supplying operating power to said heat engine means by mechanically actuating said heat engine means and thereby experiencing a pressure decrease.

2. A thermal energy accumulation means as disclosed in claim 1 wherein said fluid flowing under pressure from a source comprises water flowing under pressure from a water main.

3. A thermal energy accumulation means as disclosed in claim 1 wherein said controlled volume comprises a bathroom sink.

4. In combination with a pressurized fluid source supplying fluid flow to a controlled volume for flow therethrough, thermal energy accumulation means for deriving operating power from said pressurized fluid flow to transfer an amount of thermal energy from fluid leaving said controlled volume to fluid entering said controlled volume sufficient to accumulate thermal energy inside said controlled volume and thereby effect a temperature rise in said fluid as said fluid flows therethrough, said thermal energy accumulation means comprising:

a. compression-condensation means, an expansion valve means, an evaporator means and a heat exchanger means, said controlled volume having an inlet and an outlet, said compression-condensation means having a pressurized flow inlet, a vapor inlet and a combined flow outlet, said expansion valve means having an inlet and an outlet, said evaporator means having a vapor inlet, a vapor outlet, a return flow inlet and a return flow outlet, said heat exchanger means having a pressurized flow inlet, a pressurized flow outlet, a return flow inlet and a return flow outlet, b. the outlet of said expansion valve means being coupled to the vapor inlet of said evaporator means, the pressurized flow outlet of said heat exchanger means being coupled to the pressurized flow inlet of said compression-condensation means, the vapor outlet of said evaporator means being coupled to the vapor inlet of said compression-condensation means, the combined flow outlet of said compression-condensation means being coupled to the inlet of said controlled volume, the outlet of said controlled volume being coupled to the return flow inlet of said heat exchanger means, the return flow outlet of said heat exchanger means being coupled to the return flow inlet of said evaporator means, c. said thermal energy accumulation means further comprising an entrance conduit means for coupling fluid flow from said pressurized source to the inlet of said expansion valve means and to the pressurized flow inlet of said heat exchanger means, a first portion of said pressurized fluid from said entrance conduit flowing through said heat exchanger means wherein said first portion is heated, said first pressurized portion thereafter flowing to the pressurized flow inlet of said compression-condensation means at an elevated temperature and supplying operating power to said compression-condensation means by mechanically actuating said compression-condensation means in flowing therethrough and thereby experiencing a pressure decrease, said compression-condensation means operating to maintain a low pressure vaporization region inside said evaporator means, d. a second portion of said fluid from said entrance conduit means flowing through and being metered by said expansion valve means to the vapor inlet of said evaporator means for flow therethrough, said second portion being vaporized inside said evaporator means in said vaporization region, said second portion vaporizing as heat-of-vaporization is supplied inside said evaporator means, said vaporized second portion exiting said evaporator means through the vapor outlet of said evaporator means and flowing into the vapor inlet of said compression-condensation means wherein the vaporized second portion is condensed by a pressure increase and combined with said first portion, the heat-of-vaporization of said second portion being released and further elevating the temperature of said first portion and of the condensed second portion, the combined flow exiting said expansion compression means at a high temperature and flowing to the inlet of said controlled volume for flow therethrough to the return flow inlet of said heat exchanger means, e. high temperature fluid entering the return flow inlet of said heat exchanger means flows therethrough and transfers heat to pressurized flow entering said heat exchanger from said entrance conduit means and is thereby cooled, said cooled fluid exiting said heat exchanger means through the return flow outlet of said heat exchanger means at a temperature near that of fluid entering said heat exchanger means from said entrance conduit means, said cooled fluid flowing from the return flow outlet of said heat exchanger means to said evaporator means for flow therethrough wherein said cooled fluid is further cooled by transfer of heat-of-vaporization to fluid being vaporized inside said low pressure vaporization region, said cooled fluid exiting said evaporator means through the return flow outlet of said evaporator means and thereby exiting said thermal energy accumulation means, said fluid exiting said thermal energy accumulation means at a temperature lower than that at which said fluid enters through said entrance conduit means and thereby with a net loss in thermal energy, the major portion of the difference in thermal energy in said fluid due to said net loss being accumulated inside said controlled volume.

5. A thermal energy accumulation means as disclosed in claim 4 wherein said compression-condensation means comprises a nozzle means and a pump means, a. said pressurized fluid supplied to the pressurized flow inlet of said compression-condensation means from said heat exchanger means being supplied to said nozzle means and experiencing an increase in velocity in flowing therethrough and producing a low pressure mixing region, said nozzle means being coupled to said pump means and supplying high velocity fluid flow to said pump means to actuate said pump means, said fluid decreasing in mechanical energy in performing work in maintaining said low pressure mixing region and in actuating said pump means and thereby decreasing in velocity and increasing in pressure to a level less than the pressure at said pressurized flow inlet of said compression-condensation means, b. said pump means having an inlet and an outlet, said inlet of said pump means being coupled to said evaporator means by said vapor inlet of said compression-condensation means, said outlet of said pump means being coupled to said low pressure mixing region produced by said nozzle means, said pump means operating to maintain said low pressure vaporization region inside said evaporator means and supplying fluid evaporated inside said evaporator means to said low pressure mixing region, said vaporized portion mixing in turbulent flow in said high velocity fluid flowing from said nozzle means in said low pressure mixing region, adiabatically condensing and raising said fluid's temperature as said fluid decreases in velocity and increases in pressure in maintaining said low pressure mixing region and in actuating said pump means, said fluid thereafter flowing through the combined flow outlet of said compression-condensation means at an elevated temperature.

6. In combination with a pressurized fluid source supplying fluid flow to a controlled volume for flow therethrough, thermal energy accumulation means wherein a heat engine means and a heat exchanger means operate in combination to transfer an amount of thermal energy from fluid flowing to said controlled volume to fluid flowing from said controlled volume sufficient to effect the accumulation of a defficiency in thermal energy inside said controlled volume and thereby cause said fluid to flow therethrough at a reduced temperature, said heat engine means deriving operating power from said pressurized fluid flow and utilizing said fluid as a working fluid in said heat engine means and causing said fluid to undergo thermodynamic phase changes to effect heat transfer, said heat exchanger means being coupled to said pressurized fluid source and to said controlled volume and effecting an initial transfer of heat from fluid being supplied to said controlled volume to fluid flowing from said controlled volume, said heat engine means being coupled to said heat exchanger means and to said controlled volume to effect a final transfer of heat from fluid being supplied to said controlled volume to fluid flowing from said controlled volume by transferring heat from fluid cooled in said heat exchanger means and flowing therefrom to fluid heated in said heat exchanger means and flowing therefrom, said controlled volume receiving cooled fluid from said heat engine means, said pressurized fluid being supplied by said source flowing through said heat exchanger means in a pressurized state to said heat engine means, said pressurized fluid supplying operating power to said heat engine means by mechanically actuating said heat engine means and thereby experiencing a pressure decrease.

* * * * *

UNITED STATES PATENT AND TRADEMARK OFFICE
CERTIFICATE OF CORRECTION

PATENT NO.  : 4,476,693
DATED       : October 16, 1984
INVENTOR(S) : Lonnie G. Johnson It is certified that error appears in the above-identified patent and that said Letters Patent is hereby corrected as shown below:

The term of this patent subsequent to May 16, 1999, has been disclaimed.

Signed and Sealed this

Third Day of September 1985

[SEAL]

Attest:

DONALD J. QUIGG

Attesting Officer   Acting Commissioner of Patents and Trademarks - Designate